United States Patent [19]

Berkstresser et al.

[11] Patent Number: 4,757,232
[45] Date of Patent: Jul. 12, 1988

[54] VISUAL DISPLAY SYSTEM COMPRISING EPITAXIAL TERBIUM-ACTIVATED GARNET MATERIAL

[75] Inventors: George W. Berkstresser, Bridgewater; Tai-Chan D. Huo; Joseph Shmulovich, both of New Providence, all of N.J.

[73] Assignee: American Telephone and Telegraph Company, AT&T Bell Laboratories, Murray Hill, N.J.

[21] Appl. No.: 692,031

[22] Filed: Jan. 16, 1985

[51] Int. Cl.$^4$ .................. H01J 29/20; C09K 11/46
[52] U.S. Cl. .................. 313/468; 252/301.4 R
[58] Field of Search .................. 313/467, 468; 252/301.4 R

[56] References Cited

U.S. PATENT DOCUMENTS 4,180,477 12/1979 Barnes .................. 252/301.4 R

OTHER PUBLICATIONS

*SID International Symposium Digest of Technical Papers* (1983), by B. R. Critchley et al, pp. 122–123.
*Philips J. Research*, vol. 35 (1980), "Thin Single Crystalline Phosphor Layers Grown by Liquid Phase Epitaxy" by J. M. Robertson et al, pp. 354–371.
*Luminescene of Inorganic Solids*, P. Goldberg, Editor, Academic Press, New York (1966), pp. 2–52.
*Physical Review B*, vol. 19(2), Jan. 15, 1979, "Investigation of Competitive Recombination Processes in Rare-Earth Activated Garnet Phosphors" by D. J. Robbins et al, pp. 1254–1269.
*Applied Physics Letters* 37(5), Sep. 1, 1980, "Epitaxially Grown Monocrystalline Garnet Cathode-Ray Tube Phosphor Screens", by J. M. Robertson et al, pp. 471–472.
*Philips J. Research*, vol. 36, No. 1 (1981), "Colourshift of the Ce+ Emission in Monocrystalline Epitaxially Grown Garnet Layers" by J. M. Robertson et al, pp. 15–30.
*Thin Solid Films*, 114 (1984), "Cathodoluminescent Garnet Layers" by J. M. Robertson et al, pp. 221–240.
*Solid State Communications*, vol. 36 (1980), "Comparison of Theoretical and Measured Efficiencies for Tb$^{3+}$-Activated Garnet Oxide Phosphors", pp. 691–693.

Primary Examiner—David K. Moore
Assistant Examiner—K. Wieder
Attorney, Agent, or Firm—Eugen E. Pacher

[57] ABSTRACT

A novel epitaxial phosphor having high luminosity at about 540 nm has the composition $(Y_{3-x-y}Tb_xRE_y)(Al_{5-w}Ga_w)O_{12}$, with RE being one (or more) 4f-type rare earth(s) other than Tb, $0.09 < x < 0.7$, and $1.5 < w < 2.5$. In preferred embodiments, RE is Lu, Yb, or Tm, $0.1 < x < 0.3$, and $1.8 < w < 2.2$. In further preferred embodiments, the phosphor composition is adjusted to yield a material having a lattice constant within 0.002 nm of the lattice constant of the substrate, typically $Y_3Al_5O_{12}$. The phosphor is typically grown by liquid phase epitaxy and has application in a variety of apparatus, including avionic displays and flight simulators.

12 Claims, 2 Drawing Sheets

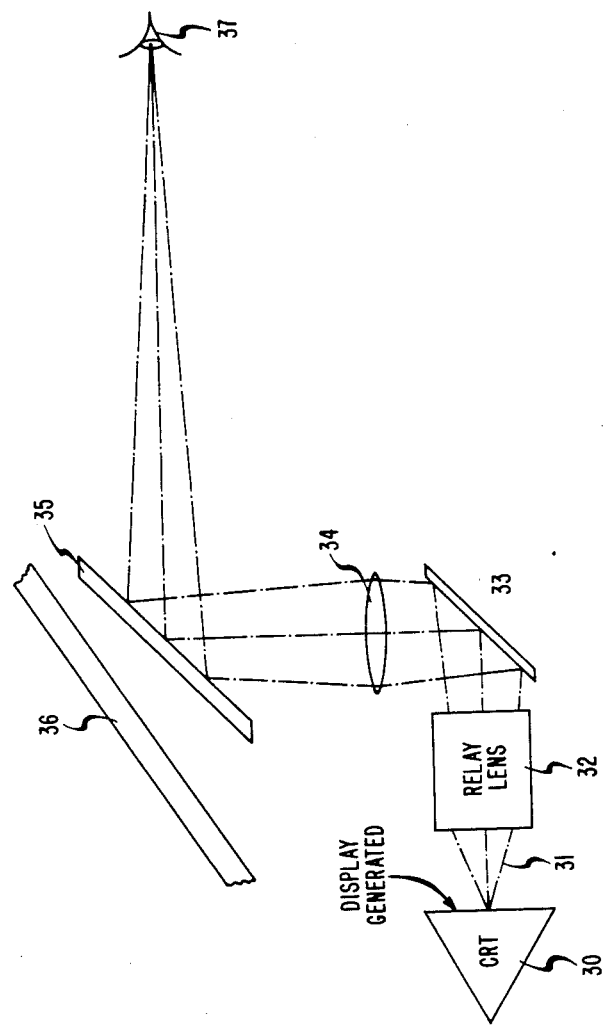

VISUAL DISPLAY SYSTEM COMPRISING EPITAXIAL TERBIUM-ACTIVATED GARNET MATERIAL

The Government has rights in this invention pursuant to Contract No. F33615-83-C-1072 awarded by the United States Air Force.

FIELD OF THE INVENTION

This invention pertains to the field of inorganic phosphors and to visual display systems utilizing such phosphors.

BACKGROUND OF THE INVENTION

This invention concerns visual display devices utilizing inorganic phosphors that emit visible electromagnetic radiation when excited by energetic electrons (cathodoluminescence, CL) or by electromagnetic radiation (photoluminescence, PL). Although visual display technology utilizing phosphors, especially cathode ray tube (CRT) technology, is the product of many years of intense effort and thus is quite mature, there exist numerous potential applications for such displays that are currently unrealized or are only imperfectly realized. These applications share a common requirement of high phosphor luminosity. Among these applications are projection displays, high resolution displays, and high brightness displays for viewing in the presence of high ambient light levels, e.g., avionic displays, such as head-up displays, or flight simulators. Novel technologies are being developed for these and other applications, e.g., holographic combiners, that require intense narrow-band luminescent emission. Such "monochromatic" phosphors are also of interest in a variety of more conventional applications.

Prior art display devices often employ powder phosphors. In particular, a powder phosphor having a composition $(Y_{2.91}Tb_{0.09})(Al_3Ga_2)O_{12}$ is known under the designation JEDEC P53. See B. R. Critchley and J. Lunt, *Society for Information Display, International Symposium, Digest of Technical Papers*, 1983, pages 122–123. Critchley and Lunt report that the luminous efficiency of $(Y_{3-a}Tb_a)Al_5O_{12}$ is maximum for a between 0.06 and 0.09, and drops for $a > 0.09$. The luminous efficiency of powder phosphors of composition $Y_{2.91}Tb_{0.09}Al_{5-b}Ga_bO_{12}$ was found to peak at $b = 2$.

Although P53, the prior art powder phosphor, has high luminous efficiency, it can be expected to be subject to shortcomings that are inherent in powder phosphors. These shortcomings include poor thermal properties, degradation of efficiency with time, and limited resolution.

Many of the shortcomings of prior art powder phosphor targets can be alleviated by the use of single crystal phosphor targets, typically consisting of a monolithic layer of crystalline phosphor that is bonded at the atomic level to a single crystal face plate. Such epitaxial targets are typically grown by liquid phase epitaxy (LPE), although other growth techniques may also be applicable. See, for instance, J. M. Robertson et al., *Philips Journal of Research*, Vol. 35, pages 354–371 (1980). Single crystal targets have been found to be capable of withstanding input power densities in excess of $10^9$ W/m$^2$ without showing measurable degradation, and can have improved resolution as compared to powder phosphor targets.

The principles of luminescence in inorganic solids are well known and will not be reviewed herein in detail. (See, for instance, *Luminescence of Inorganic Solids*, P. Goldberg, Editor, Academic Press, New York (1966), especially pages 2–52.) Briefly, luminescent emission from inorganic solids involves optical transitions between electronic states characteristic of the radiating substance. The radiating entity, e.g., an atom occupying a crystal lattice site, is raised into an excited state through interaction with the excitation means, e.g., a UV photon or an energetic electron, followed by the entity's return to the electronic ground state, typically by a series of transitions comprising at least one radiative transition involving emission of a photon of wavelength in the visible part of the spectrum.

Luminescence of most inorganic solids involves impurities, e.g., dopants, or structural defects. If the impurity or defect is the radiation-emitting entity, it is referred to as an "activator," and we will follow this usage herein.

Although single crystal phosphors tend to have luminescent properties whose gross features are similar to those of powder phosphors of the same composition, the detailed features tend to differ in a generally unpredictable manner. Several reasons exist for this. For instance, since a powder phosphor is typically formed by a different process than the single crystal phosphor, chemical differences (e.g., different phases) may exist. Also, the crystal lattice in powder particles can be expected to be heavily strained, with a high defect density, whereas the lattice of a single crystal phosphor typically is relatively strain free and free of defects. Since luminescence is quite sensitive to the details of the crystal field, these lattice differences can lead to significant differences in the luminescence.

One of the materials whose luminescent properties have been investigated extensively is $Y_3Al_5O_{12}$, generally referred to as YAG. In particular, rare earth doped (including $Tb^{3+}$ doped) YAG has been investigated. See, for instance, D. J. Robbins et al, *Physical Review B*, Vol. 19(2), pages 1254–1269 (1979). See also, U. S. patent application Ser. No. 542,391, filed Oct. 17, 1983, now U.S. Pat. No. 4,550,256, entitled "Visual Display System Utilizing High Luminosity Single Crystal Garnet Material," by G. W. Berkstresser et al, wherein an epitaxial single crystal garnet material comprising $Tb^{3+}$ as sensitizer and $Ce^{3+}$ as activator is disclosed. The discussion below will be limited to epitaxial Tb-activated YAG phosphors.

J. M. Robertson et al (*Applied Physics Letters*, Vol. 37(5), pages 471–472 (1980)) have shown that the light output of epitaxial $Y_{3-x}Tb_xAl_5O_{12}$ on YAG has a broad maximum at x about 0.05. Studies have also been made on the effect of substituting gallium for some or all of the aluminum in epitaxial rare earth-doped YAG. See, for instance, J. M. Robertson et al, *Philips Research Journal*, Vol. 36(1), pages 15–30 (1981), where it is shown that Ga-substitution in Ce-doped YAG leads to deterioration in luminescence. More generally, Robertson has repeatedly stated that epitaxial gallium garnets are less efficient host lattices than the corresponding aluminum garnets. See, for instance, J. M. Robertson, *Thin Solid Films*, Vol. 114, pages 221–240 (1984), e.g., at 225 and 231. The prior art thus does suggest that a decrease in luminosity is likely to result from partial gallium substitution for aluminum in Tb- (and other rare earths) activated epitaxial garnet phosphors.

Because of the great importance of high brightness visual displays, a phosphor that has a narrow emission band near the peak visual response of the human eye at 550 nm, that has high conversion efficiency, high power capability, high temperature capability, permits high resolution, and is not subject to substantial degradation is of considerable technological significance. This application discloses such a phosphor.

SUMMARY OF THE INVENTION

The inventive visual display system comprises an excitation beam source (electron beam or electromagnetic radiation), beam deflection means, beam modulation means, and a screen comprising epitaxial phosphor material on a single crystal substrate. The inventive phosphor comprises epitaxial garnet material comprising $Tb^{3+}$ as activator, the garnet material being substantially of composition $(Y_{3-x-y}Tb_xRE_y)(Al_{5-w}Ga_w)O_{12}$, with RE being one (or more) rare earth (4f-type) element(s) other than Tb, with $0.09 < x < 0.7$, preferably between 0.1 and 0.3, and $1.5 < w < 2.5$, preferably between 1.8 and 2.2. In preferred embodiments RE is Lu, Yb, or Tm, with the composition of the preferred phosphors, especially the value of y, adjusted to yield epitaxial material that is lattice matched to the substrate. By this we mean that the epitaxial phosphor material has a lattice constant within about $\pm 0.002$ nm of that of the substrate material. The substrate may be $Y_3Al_5O_{12}$, which has a lattice constant of 1.212 nm at room temperature. In currently most preferred phosphors, RE is Lu, with $0.1 < x < 0.3$, $2.7 < y < 2.9$, and $1.8 < w < 2.2$.

We have found that the emission from epitaxial phosphor according to the invention has unexpectedly high intensity, and that the phosphor is especially useful for high power applications. Typically, the Tb emission intensity in the $540 \pm 5$ nm spectral range, at power densities greater than $10^8$ W/m$^2$, is at least 10 percent greater in preferred phosphors according to the invention than in prior art epitaxial phosphors of composition $Y_{3-x}Tb_xAl_5O_{12}$, for the same Tb concentration and the same excitation conditions, with at least 70% of the total visible emitted radiation power being in the 535-545 nm spectral range.

BRIEF DESCRIPTION OF THE DRAWINGS

FIG. 3 schematically shows an exemplary avionic display system in which phosphor according to the invention can usefully be incorporated.

DETAILED DESCRIPTION

We have made the unexpected discovery that there exists a compositional range in which the CL of at least some epitaxial phosphors of composition $(Y_{3-x-y}Tb_xRE_y)(Al_{5-w}Ga_w)O_{12}$, can be significantly higher than that of the corresponding epitaxial lattice matched Ga-free phosphor. As was pointed out before, the prior art suggests that gallium garnets are less efficient host lattices for rare earth activators than the corresponding aluminum garnets. Thus, based on the prior art, an increase of CL in aluminum-gallium garnet hosts is not expected.

Figure 1:
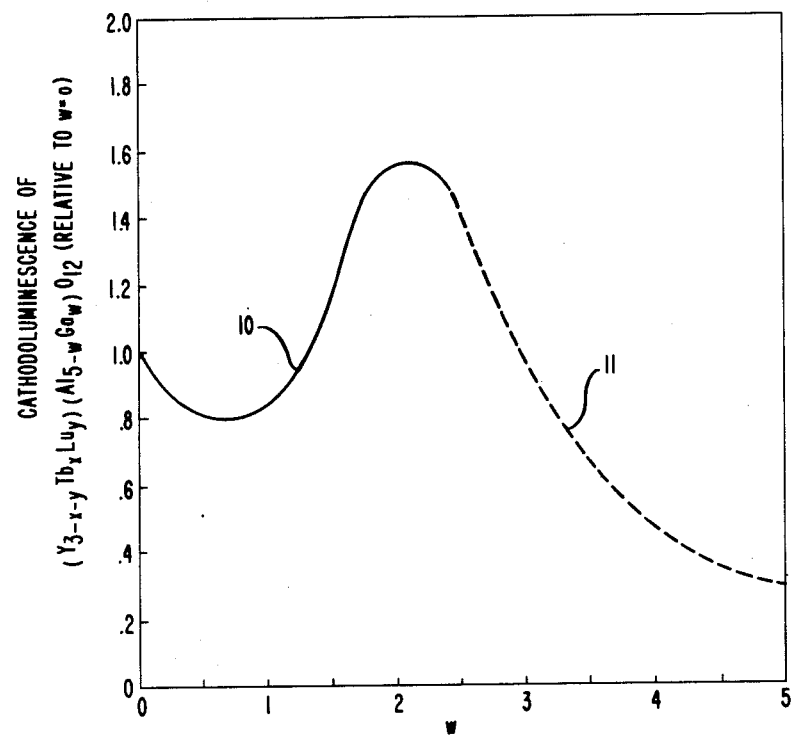
FIG. 1 shows the normalized CL of epitaxial garnet material of composition $(Y_{3-x-y}Tb_xLu_y)(Al_{5-w}Ga_w)O_{12}$, as a function of Ga content.

The unexpected result is illustrated by FIG. 1, wherein the portion 10 of the curve shows the measured CL of single crystal phosphors of composition $(Y_{3-x-y}Tb_xLu_y)(Al_{5-w}Ga_w)O_{12}$ as a function of w, with $y \sim 1.4w$, and x chosen to result to maximum CL for the given value of w. The phosphors were grown on YAG by liquid phase epitaxy. For $w \gtrsim 2.2$, faceting occurred, and no experimental results were obtained for the portion 11 of the curve, i.e., for $2.2 \lesssim w < 5$. As FIG. 1 shows, the CL of the phosphor according to the invention can reach a maximum of about 1.6 times the maximum CL of the prior art single crystal phosphor $Y_{3-x}Tb_xAl_5O_{12}$.

The data on which FIG. 1 is based were obtained by exciting the phosphors with a 30 keV electron beam, yielding a beam power density of about $3 \times 10^9$ W/m$^2$. The beam dwell time was 160 nanoseconds, the emitted light was passed through a 535-545 nm band filter and detected by means of a standard photomultiplier tube.

Although the discussion herein is principally in terms of phosphors in which RE is Lu, we expect that advantageous results are obtainable also with other compositions in which RE is a 4f-type rare earth element (other than Tb), or a combination of such rare earths.

We have found that particularly advantageous emission results can be obtained if the epitaxial phosphor material is substantially lattice matched to the substrate. In particular, we believe that it is only under substantially lattice matched conditions that the highest image resolution can be achieved. Although high resolution capability of a phosphor is generally a very desirable property, there exist possible applications of the inventive phosphor (e.g., as a high intensity, narrow band light source) that do not require high resolution, and we do not consider our invention to be limited to lattice matched phosphors.

Since Ga substitution for Al results in an increase of the lattice constant of YAG, it is necessary, in order to achieve lattice matching of the phosphor and the substrate, to counteract the Ga-caused lattice expansion with the incorporation of a rare earth element that causes lattice contraction of YAG. Such elements are Lu, Yb, and Tm, and these elements (or combinations thereof) are preferred constituents of phosphors according to the invention.

In particular, the addition of gallium to YAG results in an increase of the lattice constant by about 0.00546 nm/mole, and the addition of Er, Tm, Yb, and Lu results in decreases of about 0.00076, 0.00176, 0.00286, and 0.00396 nm/mole, respectively. If RE is Lu, then an advantageous composition results if $y \sim 1.4w$.

We have found that the CL of phosphors according to the invention depends at least to some degree on the growth temperature of epitaxial phosphor layers. At least for Lu-containing phosphors according to the invention, we have found that it is advantageous to choose a growth temperature in the range from about 1050°-1090° C. Furthermore, we have observed that the CL of phosphors according to the invention is also a function of substrate orientation, with the most efficient phosphors being obtained with substrates of (111) orientation.

Single crystal YAG is currently considered to be the preferred substrate material, due, inter alia, to its availability in relatively large size (e.g., disks of about 75 mm diameter), of high crystalline quality, at a relatively low price. However, other substrate materials, e.g., garnets such as $Y_3ScAl_4O_{12}$ or $Y_2CaAl_4ZrO_{12}$, or nongarnets such as sapphire, may also be useful in some circumstances.

The composition of phosphor according to the invention is substantially $(Y_{3-x-y}Tb_xRE_y)(Al_{5-w}Ga_w)O_{12}$, with minor amounts of other elements, present as impurities or as intentionally added constituents, not excluded. Typically, we expect that Y, Tb, RE, Al, Ga and O will constitute at least 95% by weight, frequently at least 99%, of phosphors according to the invention. RE is intended to signify any 4f-type rare earth element (other than Tb), or combination of such rare earths, with Lu, Yb and Tm being currently preferred. Typically, $0.09 < x < 0.7$, and $1.5 < w < 2.5$, with the currently preferred range for x being between 0.1 and 0.3, and for w being between 1.8 and 2.2.

Phosphors according to the invention are epitaxial with the underlying substrate material, i.e., there exists at least one crystalline direction which is the same in the substrate and the epitaxial layer. In preferred embodiments, the phosphor layer is monocrystalline.

Figure 2:
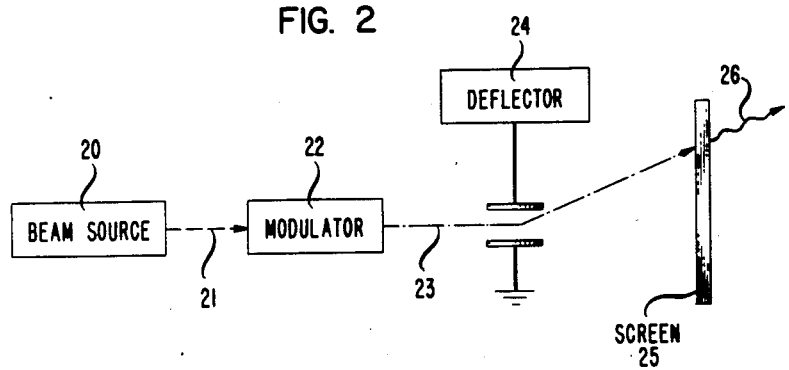
FIG. 2 schematically shows apparatus for the practice of the invention.

Apparatus for the practice of the invention is schematically depicted in FIG. 2, wherein excitation beam 21 is emitted by beam source 20, is amplitude modulated by modulator 22, the modulated beam 23 is appropriately deflected by deflector 24, and impinges on screen 25, with luminescent radiation 26 emitted from the excited region of the screen. The beam can be either an electron beam or electromagnetic radiation, typically in the UV, with the former being currently preferred. It is to be understood that the excitation beam can be amplitude modulated to any degree, including 100% modulation, i.e., switching the beam on and off, and that the modulating signal can have any desired form.

Although apparatus of the type shown in FIG. 2 can be used to directly display an image, as is the case for instance in a cathode ray tube (CRT), the phosphor according to the invention can advantageously be used in more complex information display systems, e.g., in head-up avionic displays, or in other projection displays. An exemplary head-up display is schematically depicted in FIG. 3, wherein the display is generated on the face plate of CRT 30, visible radiation 31 is emitted by the phosphor, passes through relay lens 32, is deflected by fold mirror 33, collimated by lens 34, projected onto combiner 35, and partially reflected from the partially silvered surface of the combiner. The reflected image can be observed, as is indicated schematically by eye 37 of an observer. An aircraft canopy 36 is also schematically depicted.

The display shown in FIG. 3 is of the refractive type, however, other types are known, e.g., reflective displays which use mirror optics, or diffractive displays which use a holographic screen. Phosphors according to the invention can be used in all of the known types of display systems. We believe that they can particularly advantageously be used in holographic displays, since the intense narrow band emission of the inventive phosphor permits the design of highly efficient combiners which can have very high transmission efficiency for all wavelengths of light except for the wavelengths emitted by the phosphor, and thus only minimally interfere with direct visual observation of the background. By a narrow band emission, we mean herein an emission spectrum in which more than 70% of the emitted intensity is within a 10 nm spectral range. The possible applications for phosphor according to the invention that were discussed herein are intended to be exemplary only, and practitioners will undoubtedly be able to incorporate the inventive phosphors into display devices not mentioned herein. Such obvious extensions of our teachings are considered to be within the skill of the ordinary practitioner.

EXAMPLE

A melt consisting of $Y_2O_3$, $Tb_4O_7$, $Lu_2O_3$, $Al_2O_3$, $Ga_2O_3$, PbO, and $B_2O_3$ (3,44, 10.25, 113.13, 36.23, 108.85, 6000, and 154.05 gm, respectively) was prepared in a platinum crucible in air at ambient pressure. The starting materials were commercial grade, of typically 5N purity. Standard LPE growth (melt temperature 1082° C., growth rate 5.58 $\mu$m/min, with substrate rotation at 60 rpm, rotation reversal after each revolution) produced an 8.93 $\mu$m thick epitaxial single crystal phosphor layer on a 75 mm diameter (111) YAG wafer. The composition of the phosphor was approximately $Y_{0.3}Tb_{0.2}Lu_{2.5}Al_{3.2}Ga_{1.8}O_{12}$. The CL of the sample was measured by standard methods, with a 30 keV excitation beam resulting in a power density of about $3 \cdot 10^9$ W/m. The intensity of radiation emitted in the 535–545 nm wavelength region was about 1.6 times that of a similarly excited epitaxial phosphor of composition $Y_{2.9}Tb_{0.1}Al_5O_{12}$.

What is claimed is:

1. Visual display apparatus comprising
   (a) means for producing an excitation beam,
   (b) a screen comprising a layer of phosphor material that is epitaxial with a major surface of a crystal substrate, the excitation beam caused to be incident on the screen, and
   (c) means for deflecting the excitation beam, and means for changing the intensity of the excitation beam,
   characterized in that
   (d) the epitaxial phosphor is substantially of composition $(Y_{3-x-y}Tb_xRE_y)(Al_{5-w}Ga_w)O_{12}$, with RE being at least one rare earth element selected from the group consisting of all of the 4f-type rare earth elements other than Tb, with $0.09 < x < 0.7$, $2.91 > y \geq 0$, with $x + y < 3$, and $1.5 < w < 2.5$, and
   (e) the composition of the epitaxial phosphor is selected such that the epitaxial phosphor is substantially lattice matched with the crystal substrate, and such that the epitaxial phosphor has high cathodoluminescence.

2. Apparatus according to claim 1, wherein RE is selected from the group consisting of Lu, Yb, and Tm.

3. Apparatus of claim 2, wherein the epitaxial phosphor has a lattice constant that differs at 20° C. by no more than 0.002 nm from the lattice constant of the crystal substrate.

4. Apparatus of claim 3, wherein the crystal substrate is substantially of composition $Y_3Al_5O_{12}$.

5. Apparatus of claim 4, wherein $0.1 < x < 0.3$, and $1.8 < w < 2.2$.

6. Apparatus of claim 5, wherein RE is Lu, and $2.7 < y < 2.9$.

7. Apparatus of claim 4, wherein the crystal substrate major surface substantially has (111) crystalline orientation.

8. Apparatus of claim 1, wherein the epitaxial phosphor is formed by a process comprising liquid phase epitaxy.

9. Apparatus of claim 1, wherein the excitation beam is an electron beam, and the apparatus further comprises means for projecting at least some of the radiation emitted by the epitaxial phosphor onto display means.

10. Apparatus of claim 9, wherein the display means comprises a holographic combiner screen.

11. Apparatus of claim 9, wherein the apparatus is adapted for use as an avionic information display system or for use in a flight simulator system.

12. Apparatus of claim 1, wherein the composition of the epitaxial phosphor is such that the epitaxial phosphor has, for any given x and for excitation beam power densities greater than $10^8$ W/m$^2$, a cathodoluminescent emission intensity in the spectral range 540 ±5 nm that is at least 10% greater than that of a second epitaxial phosphor of composition $Y_{3-x}Tb_xAl_5O_{12}$, for the given x, and for the same excitation beam power density and spectral range.

* * * * *